(12) United States Patent
Tsuru et al.

(10) Patent No.: US 11,028,701 B2
(45) Date of Patent: Jun. 8, 2021

(54) STRUCTURE FOR COOLING TURBINE BLADE

(71) Applicant: KAWASAKI JUKOGYO KABUSHIKI KAISHA, Kobe (JP)

(72) Inventors: Tomoko Tsuru, Akashi (JP); Katsuhiko Ishida, Kobe (JP)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 46 days.

(21) Appl. No.: 16/477,670

(22) PCT Filed: Dec. 27, 2017

(86) PCT No.: PCT/JP2017/047091
§ 371 (c)(1),
(2) Date: Jul. 12, 2019

(87) PCT Pub. No.: WO2018/135283
PCT Pub. Date: Jul. 26, 2018

(65) Prior Publication Data
US 2019/0360343 A1 Nov. 28, 2019

(30) Foreign Application Priority Data
Jan. 18, 2017 (JP) .............................. JP2017-006571

(51) Int. Cl.
*F01D 5/18* (2006.01)
*F01D 25/12* (2006.01)
(Continued)

(52) U.S. Cl.
CPC ............. *F01D 5/187* (2013.01); *F01D 5/186* (2013.01); *F01D 5/188* (2013.01); *F01D 9/065* (2013.01);
(Continued)

(58) Field of Classification Search
CPC .......... F01D 5/186; F01D 5/187; F01D 5/188; F01D 9/065; F05D 2260/201;
(Continued)

(56) References Cited

U.S. PATENT DOCUMENTS 4,407,632 A * 10/1983 Liang ...................... F01D 5/187
415/115
5,603,606 A 2/1997 Glezer et al.
(Continued)

FOREIGN PATENT DOCUMENTS

JP 4957131 B2 6/2012
JP 2014-177900 A 9/2014

*Primary Examiner* — Christopher Verdier
(74) *Attorney, Agent, or Firm* — Sughrue Mion, PLLC

(57) ABSTRACT

A structure for cooling a turbine airfoil includes: a cooling passage formed between first and second airfoil walls; a lattice structure body formed by stacking a plurality of ribs so as to form a lattice pattern; a cooling medium discharge port provided at a downstream end portion of the cooling passage for discharging cooling medium to the outside; an exposed wall portion formed as a portion of the second airfoil wall extending beyond the cooling medium discharge port to the outside; and a flat surface portion formed in the cooling passage from an outlet of the lattice structure body to the cooling medium discharge port and at which the wall surfaces of the first and second airfoil walls are formed as flat surfaces.

2 Claims, 8 Drawing Sheets

(51) Int. Cl.
*F02C 7/18* (2006.01)
*F01D 9/06* (2006.01)
(52) U.S. Cl.
CPC ................ *F01D 25/12* (2013.01); *F02C 7/18* (2013.01); *F05D 2260/201* (2013.01); *F05D 2260/221* (2013.01); *F05D 2260/22141* (2013.01)
(58) Field of Classification Search
CPC ........... F05D 2260/20; F05D 2260/202; F05D 2260/22141; F05D 2260/2212; F02C 9/18
See application file for complete search history.

(56) References Cited

U.S. PATENT DOCUMENTS

| | | | | |
|---|---|---|---|---|
| 2013/0121839 | A1* | 5/2013 | Batt | F01D 5/288 |
| | | | | 416/241 R |
| 2014/0328669 | A1* | 11/2014 | Bregman | F01D 5/187 |
| | | | | 415/115 |
| 2016/0003549 | A1 | 1/2016 | Fujimoto et al. | |
| 2016/0169003 | A1* | 6/2016 | Wong | F01D 9/041 |
| | | | | 415/1 |

* cited by examiner

STRUCTURE FOR COOLING TURBINE BLADE

CROSS REFERENCE TO THE RELATED APPLICATION

This application is based on and claims Convention priority to Japanese patent application No. 2017-006571, filed Jan. 18, 2017, the entire disclosure of which is herein incorporated by reference as a part of this application.

BACKGROUND OF THE INVENTION

Field of the Invention

The present invention relates to a structure for cooling a stator vane and a rotor blade in a turbine of a gas turbine engine.

Description of Related Art

A turbine that forms a part of a gas turbine engine is disposed downstream of a combustor and a high-temperature gas burnt in the combustor is supplied to the turbine. Thus, the turbine is exposed to high temperatures during operation of the gas turbine engine. Therefore, it is necessary to cool a stator vane and a rotor blade of the turbine. As a structure for cooling such turbine airfoils, it has been known to introduce part of air compressed by a compressor into a cooling passage formed in the airfoil and cool the turbine airfoil using the compressed air as a cooling medium (see, for example, Patent Document 1).

In the case of using part of the compressed air to cool the turbine airfoil, it is not necessary to introduce a cooling medium from the outside, so that there is a merit that the cooling structure can be simplified. However, when a large amount of air compressed by the compressor is used for cooling, it leads to a reduction in engine efficiency. Thus, it is necessary to efficiently perform cooling with as little air as possible. As a structure for cooling a turbine airfoil with high efficiency, use of a so-called lattice structure body formed by combining a plurality of ribs in a lattice pattern has been proposed (see, for example, Patent Document 2). In the lattice structure body, a cooling medium is collided against the ribs, which form the lattice structure body, to generate vortex flow, whereby the cooling efficiency is enhanced.

Meanwhile, as a structure for discharging a cooling medium within a turbine airfoil through an airfoil rear portion, causing a cooling medium to flow along a back surface of an airfoil wall at the suction surface side exposed by cutting out an airfoil wall at the pressure surface side of a turbine airfoil rear edge portion, thereby performing film cooling of the back surface, has been proposed (see Patent Document 2).

RELATED DOCUMENT

Patent Document

[Patent Document 1] U.S. Pat. No. 5,603,606
[Patent Document 2] JP Patent No. 4957131

SUMMARY OF THE INVENTION

However, in the case where film cooling of the airfoil rear edge portion is combined with the lattice structure body as disclosed in Patent Document 2, intense vortex flow coming out of the lattice structure body is discharged to an exposed wall surface and becomes caught in high-temperature gas flowing outside. As a result, it is difficult to sufficiently obtain a cooling effect by the film cooling.

Therefore, in order to solve the above-described problem, an object of the present invention is to provide a cooling structure that is able to cool the entirety of a turbine airfoil with high efficiency by cooling the interior of the turbine airfoil with high efficiency by a lattice structure body and also effectively cooling a turbine airfoil rear edge portion by film cooling.

In order to achieve the above-described object, a cooling structure for a turbine airfoil according to the present invention is a structure for cooling a turbine airfoil of a turbine driven by a high-temperature gas and includes: a cooling passage formed between a first airfoil wall of the turbine airfoil that is curved so as to be concave relative to a passage for the high-temperature gas and a second airfoil wall of the turbine airfoil that is curved so as to be convex relative to the passage for the high-temperature gas; a lattice structure body including a first rib set composed of a plurality of first ribs provided on a wall surface, of the first airfoil wall, that faces the cooling passage, and a second rib set composed of a plurality of second ribs provided on a wall surface, of the second airfoil wall, that faces the cooling passage, the second rib set being stacked on the first rib set so as to form a lattice pattern; a cooling medium discharge port provided at a downstream end portion of the cooling passage and configured to discharge the cooling medium within the cooling passage to the outside; an exposed wall portion in the form of a portion of the second airfoil wall extending beyond the cooling medium discharge port to the outside; and a flat surface portion that is a portion of the cooling passage from an outlet of the lattice structure body to the cooling medium discharge port and at which the wall surface of the first airfoil wall and the wall surface of the second airfoil wall are formed as flat surfaces.

According to this configuration, in a process in which the cooling medium discharged as vortex flow from the lattice structure body flows in the flat surface portion, the cooling medium is straightened to flow in a uniform direction along the wall surface, and then discharged through the cooling medium discharge port to the exposed wall portion. Accordingly, the high-temperature gas and the cooling medium are inhibited from being mixed together at the exposed wall portion, and a sufficient film cooling effect is obtained. Therefore, both cooling of the interior of the turbine airfoil by the lattice structure body and film cooling of the turbine airfoil rear edge portion can be achieved with high efficiency, and thus it is possible to enhance the cooling efficiency for the entirety of the turbine airfoil.

In one embodiment of the present invention, the flat surface portion may have a length within a range of not less than 1 time and not greater than 5 times of a height of the outlet of the lattice structure body. According to this configuration, a distance sufficient to straighten vortex flow discharged from the lattice structure body, for film cooling, such that a cooling effect by the lattice structure body is not substantially affected, can be ensured. Therefore, it is possible to further enhance the cooling efficiency for the entirety of the turbine airfoil.

In one embodiment of the present invention, a movement direction of the entirety of the cooling medium may be a direction along a chord of the turbine airfoil, and a plurality of the lattice structure bodies may be disposed so as to be aligned in a height direction of the turbine airfoil with a partition body interposed therebetween. Since the movement direction of the entirety of the cooling medium is caused to be the chord direction, the flat surface portion in which the lattice structure body is not present is formed in a narrow space in a rear end portion of the turbine airfoil. Thus, a reduction of the cooling effect due to omission of the lattice structure body is reduced, and it becomes easy to produce the turbine airfoil. In addition, the exposed wall portion can be ensured to be wide in the height direction of the turbine airfoil, and thus the cooling efficiency for the entirety of the turbine airfoil can be further enhanced.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Figure 1:
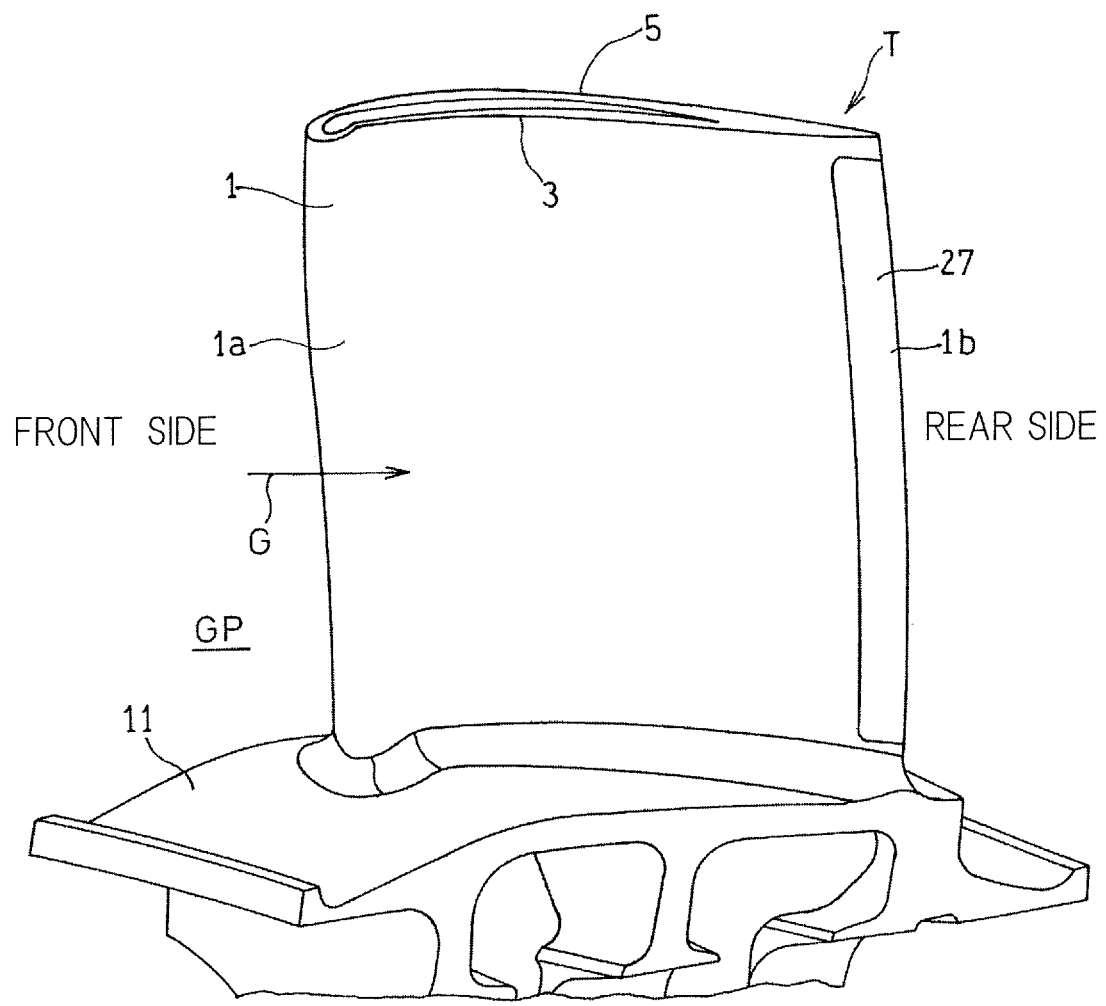
FIG. 1 is a perspective view showing an example of a turbine airfoil to which a cooling structure according to an embodiment of the present invention is applied.

Hereinafter, embodiments of the present invention will be described with reference to the drawings. FIG. 1 is a perspective view showing a rotor blade 1 of a turbine of a gas turbine engine, to which a cooling structure for a turbine airfoil in accordance with an embodiment of the present invention is applied. The turbine rotor blade 1 forms a part of a turbine T that is driven by a high-temperature gas G, flowing in the arrow direction, which is supplied from a combustor that is not shown. The turbine rotor blade 1 includes: a first airfoil wall 3 that is curved so as to be concave relative to a passage GP for the high-temperature gas G; and a second airfoil wall 5 that is curved so as to be convex relative to the passage GP for the high-temperature gas. In the present specification, the upstream side along the flow direction of the high-temperature gas G (the left side in FIG. 1) is referred to as a front side, and the downstream side (the right side in FIG. 1) is referred to as a rear side. In the following description, the turbine rotor blade 1 is mainly described as an example of a turbine airfoil to which the cooling structure is provided, but the cooling structure according to the present embodiment can be similarly applied to a turbine stator vane that is a turbine airfoil, unless particularly described otherwise.

Figure 2:
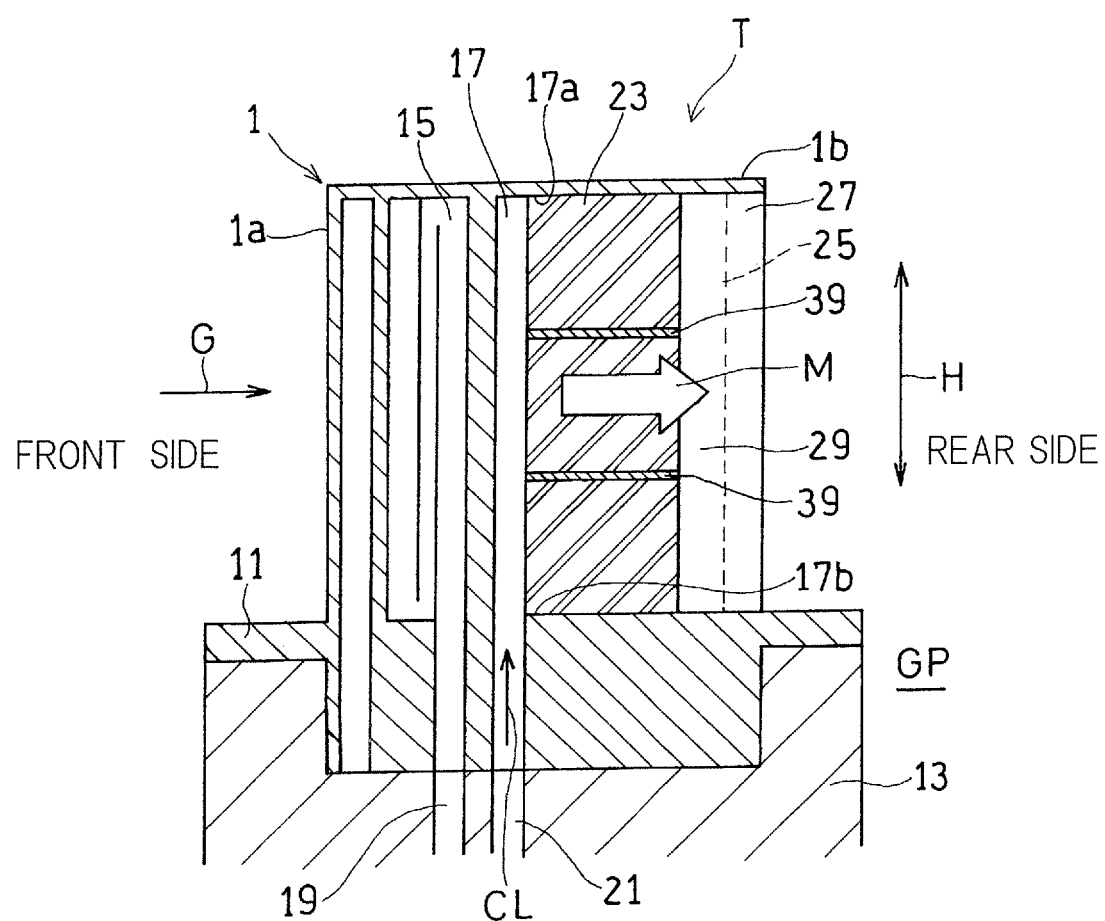
FIG. 2 is a longitudinal cross-sectional view schematically showing the turbine airfoil in FIG. 1.
Figure 3:
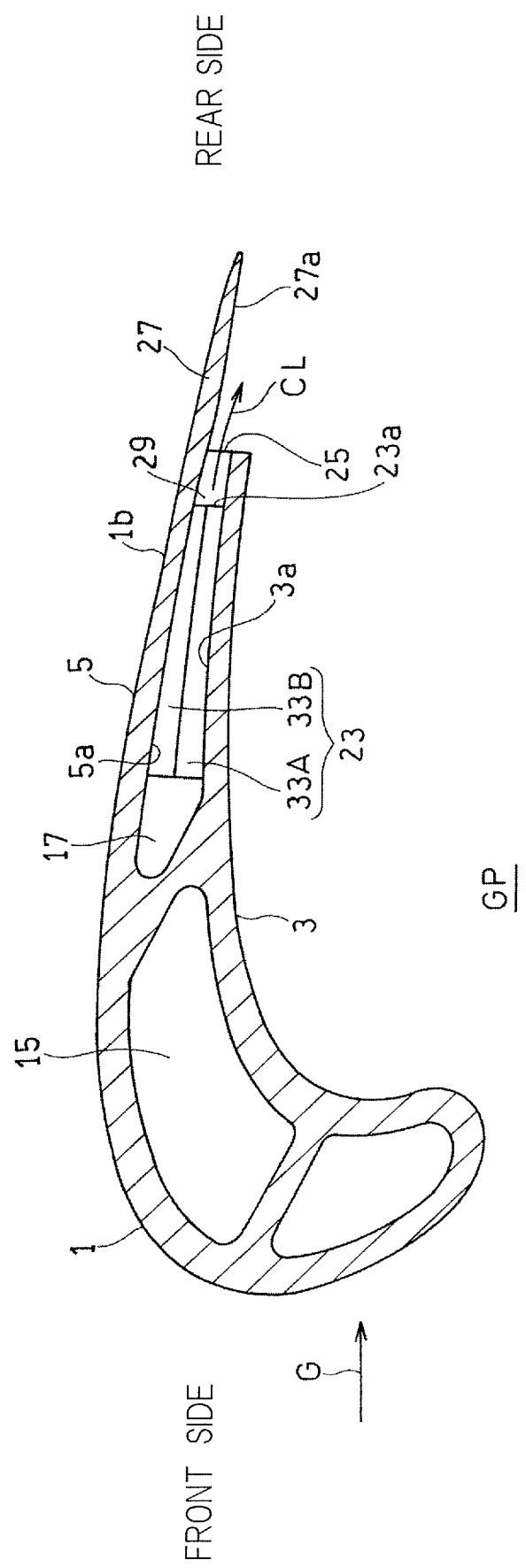
FIG. 3 is a transverse cross-sectional view of the turbine airfoil in FIG. 1.

Specifically, a large number of turbine rotor blades 1 are provided in a circumferential direction in an embedded manner such that, as shown in FIG. 2, a platform 11 of each turbine rotor blade 1 is connected to an outer circumferential portion of a turbine disc 13, whereby the turbine T is formed. The turbine rotor blade 1 is formed with, inside a front portion 1a thereof, a front cooling passage 15 so as to extend in a blade height direction H and turn back. The turbine rotor blade 1 is also formed with, inside a rear portion 1b thereof, a rear cooling passage 17. As shown in FIG. 3, these cooling passages are formed by utilizing a space between the first airfoil wall 3 and the second airfoil wall 5.

As shown in FIG. 2, a cooling medium CL that is part of a compressed air from the compressor flows through a front cooling medium introduction passage 19 and a rear cooling medium introduction passage 21, which are formed within the turbine disc 13 at the radially inner side, toward the radially outer side, and is introduced into the front cooling passage 15 and the rear cooling passage 17, respectively. The cooling medium CL supplied to the front cooling passage 15 is discharged to the outside through a cooling medium discharge hole (not shown) that communicates with the outside of the turbine rotor blade 1. The cooling medium CL supplied to the rear cooling passage 17 is discharged through a cooling medium discharge port 25, which will be described later, to the outside. Hereinafter, an example in which the cooling structure according to the present embodiment is provided only to the rear portion 1b of the turbine rotor blade 1 will be described. However, the cooling structure according to the present embodiment may be provided in any area including the rear portion 1b of the turbine rotor blade 1. In the present embodiment, in the rear cooling passage 17, the entirety of the cooling medium CL flows in a direction traversing from the front side to the rear side. In the following description, the flow direction of the entirety of the cooling medium CL is referred to as a cooling medium movement direction M.

As shown in FIG. 3, the rear cooling passage 17a is provided with a lattice structure body 23, which is one element that forms a part of the cooling structure for cooling the turbine rotor blade 1. The lattice structure body 23 includes a plurality of ribs provided upright on each of wall surfaces of the first airfoil wall 3 and the second airfoil wall 5 that face the rear cooling passage 17. In the following description, the wall surface of the first airfoil wall 3 that faces the rear cooling passage 17 is referred to as a first wall surface 3a, and the wall surface of the second airfoil wall 5 that faces the rear cooling passage 17 is referred to as a second wall surface 5a.

As elements that form a part of the cooling structure for cooling the turbine rotor blade 1, the turbine rotor blade 1 further includes the cooling medium discharge port 25, an exposed wall portion 27, and a flat surface portion 29. In a rear end portion of the turbine rotor blade 1, a portion of the second airfoil wall 5 whose wall surface is exposed to the outside (the passage GP for the high-temperature gas) by cutting out the first airfoil wall 3 forms the exposed wall portion 27. The cooling medium discharge port 25 is provided at a downstream end portion (rear end portion) of the rear cooling passage 17 and discharges the cooling medium CL within the rear cooling passage 17 to the outside. The cooling medium discharge port 25 is formed as a gap between the first wall surface 3a and the second wall surface 5a at a location where the first airfoil wall 3 is cut out as described above. In other words, the exposed wall portion 27 is provided in the form of a portion of the second airfoil wall 5 extending beyond the cooling medium discharge port 25 to the outside. Therefore, a wall surface 27a of the exposed wall portion 27 that faces the first airfoil wall 3 side forms a wall surface that is contiguous from the second wall surface 5a. The flat surface portion 29 is formed in a region from an outlet 23a of the lattice structure body 23 to the cooling medium discharge port 25 within the rear cooling passage 17. At the flat surface portion 29, the first wall surface 3a and the second wall surface 5a are formed as flat surfaces, that is, surfaces on which no projection and no recess are provided. By the flat surface portion 29, the cooling medium CL discharged from the lattice structure body 23 is guided toward the cooling medium discharge port 25.

The rear end portion of the turbine rotor blade 1 has a shape that tapers toward the rear side. As shown in FIG. 3, in the rear end portion of the turbine rotor blade 1, the first wall surface 3a of the first airfoil wall 3 and the second wall surface 5a of the second airfoil wall 5 extend toward the rear side so as to get closer to each other. Due to this configuration, the passage area of the rear cooling passage 17 at the flat surface portion 29 gradually reduces toward the rear side.

Figure 4:
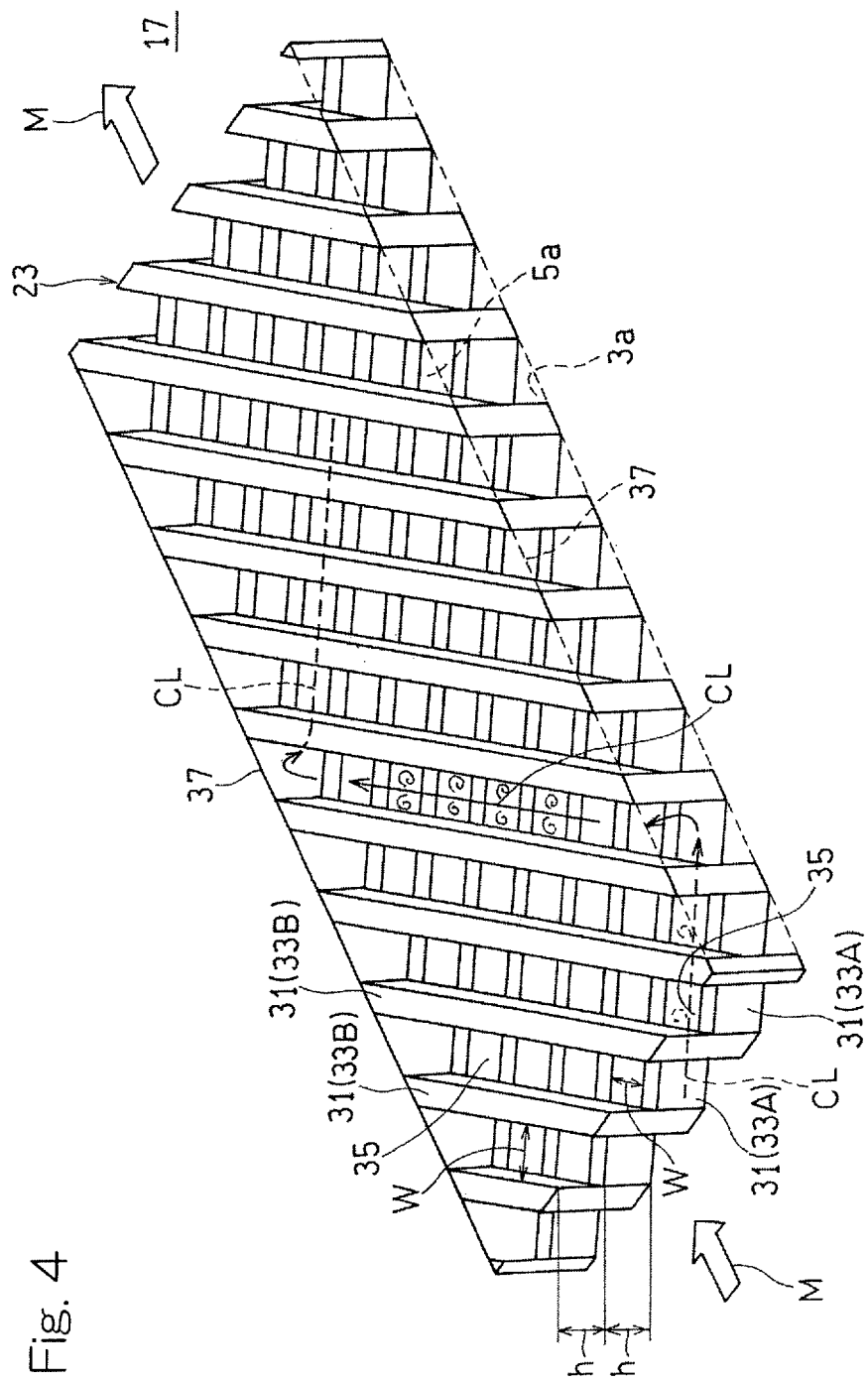
FIG. 4 is a perspective view schematically showing a lattice structure body used in the cooling structure for the turbine airfoil in FIG. 2.

As shown in FIG. 4, the lattice structure body 23 is formed of combination of a plurality of rib sets provided on both wall surfaces 3a and 5a, which face the rear cooling passage 17, each of the rib sets including a plurality of ribs 31 provided at equal intervals so as to be parallel to each other. The lattice body is formed by stacking the rib sets on each other so as to form a lattice pattern. In the present embodiment, the lattice structure body 23 is formed by combining two rib sets, that is, a first rib set (the lower rib set in FIG. 4) 33A and a second rib set (the upper rib set in FIG. 4) 33B, such that the rib sets 33A and 33B are stacked on each other in a height direction of the ribs 31 (a direction in which the first wall surface 3a and the second wall surface 5a face each other) so as to form a lattice pattern.

In the lattice structure body 23, the gap between the adjacent ribs 31, 31 of each rib set 33A, 33B form a passage (lattice passage) 35 for the cooling medium CL. In the rear cooling passage 17, the lattice structure body 23 is placed between two side walls 37, 37, which extend in the cooling medium movement direction M, so as to be oriented such that the lattice passages 35 are inclined relative to the cooling medium movement direction M. The cooling medium CL introduced into the lattice structure body 23 initially flows through the lattice passage 35 of one of the rib sets (the lower first rib set 33A in the shown example) as shown by a broken line arrow in FIG. 4 while traversing the other of the rib sets (the upper second rib set 33B in the shown example), thereby generating vortex flow. Thereafter, the cooling medium CL collides against the side wall 37 and flows into the lattice passage 35 of the other of the rib sets (the upper second rib set 33B in the shown example) as shown by a solid line arrow in FIG. 4. After repeating a process of flowing through the lattice passage 35 of one of the rib sets, colliding against the side wall 37, and flowing into the lattice passage 35 of the other of the rib sets in the lattice structure body 23 as described above, the cooling medium CL is discharged from the lattice structure body 23. In this process, vortex flow is generated in flow of the cooling medium CL when the cooling medium CL traverses the other of the rib sets extending in a direction traversing the lattice passage 35, whereby cooling of the wall surfaces 3a and 5a is enhanced.

In the present embodiment, as shown in FIG. 4, in the lattice structure body 23, the heights of the upper and lower ribs 31, that is, lattice passage heights h in the blade thickness direction, are equal to each other. In addition, the interval between the ribs 31, 31 in the first rib set 33A is equal to the interval between the ribs 31, 31 in the second rib set 33B. That is, a lattice passage width w in the first rib set 33A and a lattice passage width w in the second rib set 33B are equal to each other. The angle formed by the extension direction of the first rib set 33A and the extension direction of the second rib set 33B is set to about 90°. As a matter of course, the arrangement configuration of the plurality of ribs 31 in each rib set is not limited to the shown example, and may be set as appropriate in accordance with the structure of the turbine airfoil, required cooling performance, etc.

In the embodiment shown in FIG. 2, a plurality of (three in the shown example) lattice structure bodies 23, which are separated from each other in the height direction H by a plurality of (two in the shown example) partition bodies 39, 39, are provided in the rear cooling passage 17. An upper end wall 17a, the partition bodies 39, and a lower end wall 17b of the rear cooling passage 17 shown in FIG. 2 correspond to the side walls 37 in FIG. 4. In the example in FIG. 2, a flat-plate-like partition plate is used as each partition body 39. As a matter of course, each partition body 39 is not limited to the partition plate and any component may be used, as long as each partition body 39 can substantially obstruct flow of the cooling medium CL between the adjacent lattice structure bodies 23, and the cooling medium CL can be collided against the side portion of the lattice structure body 23 and return so as to flow from one lattice passage 35 to the other lattice passage 35 (FIG. 4).

Figure 5:
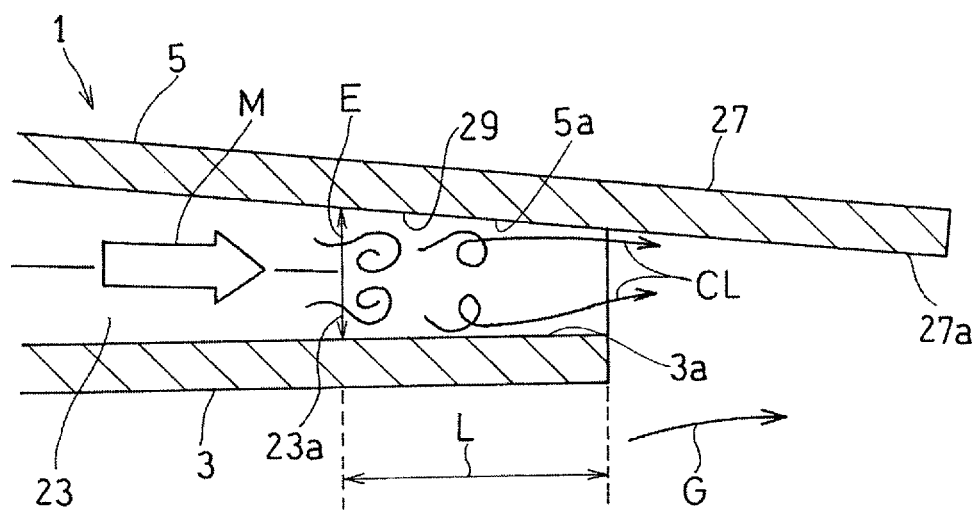
FIG. 5 is a longitudinal cross-sectional view schematically showing an area around a rear end portion of the turbine airfoil in FIG. 2 in an enlarged manner.

As shown in FIG. 5, the cooling medium CL having passed through the lattice structure body 23 is discharged mainly as vortex flow through the outlet 23a of the lattice structure body 23. Thereafter, the cooling medium CL that has been discharged as vortex flow is straightened to flow in a uniform direction toward the rear side along the wall surfaces 3a and 5a while flowing on the wall surfaces 3a and 5a at the flat surface portion 29 toward the rear side. The straightened cooling medium CL is discharged through the cooling medium discharge port 25 to the passage GP for the high-temperature gas. Accordingly, at the exposed wall portion 27, the cooling medium CL flows in a uniform direction along the wall surface 27a of the exposed wall portion 27. If intense vortex flow remains in the flow of the cooling medium CL discharged to the exposed wall portion 27, the vortex flow becomes caught in the flow of the high-temperature gas G, and the cooling medium CL and the high-temperature gas G are mixed together, so that film cooling of the exposed wall portion 27 is hindered. However, in the present embodiment, as described above, at the exposed wall portion 27, the cooling medium CL flows in a uniform direction along the wall surface 27a (that is, in a state where the vortex flow is eliminated). Thus, mixing of the high-temperature gas G and the cooling medium CL is suppressed at the exposed wall portion 27, and film cooling of the exposed wall portion 27 is effectively performed.

Furthermore, in the present embodiment, a length L (which is defined as a distance along the cooling medium movement direction M) of the flat surface portion 29 is set within a range of 1 to 5 times of a height E of the outlet 23a of the lattice structure body 23. In the shown example, the length L of the flat surface portion 29 is twice the outlet height E of the lattice structure body 23. By providing the flat surface portion 29 to space the outlet 23a of the lattice structure body 23 and the cooling medium discharge port 25 apart from each other as described above, the direction of flow of the cooling medium CL flowing out through a plurality of outlets 23a of the lattice structure body 23 toward the rear side can be made uniform. On the other hand, if the length L of the flat surface portion 29 is excessively long, vortex flow of the cooling medium CL is eliminated, and a heat transfer coefficient decreases, so that the area of a portion that does not contribute to cooling by the lattice structure body 23 increases. Therefore, the length L of the flat surface portion 29 is preferably shortened within a range sufficient to eliminate vortex flow of the cooling medium CL discharged from the lattice structure body 23 and make the flow of the cooling medium CL uniform. In addition, it has been found that the intensity (swirl speed) of the vortex flow of the cooling medium CL discharged from the lattice structure body 23 mainly depends on the outlet height E of the lattice structure body 23, and thus it is appropriate to specify the length L of the flat surface portion 29 on the basis of the outlet height E of the lattice structure body 23.

Figure 6:
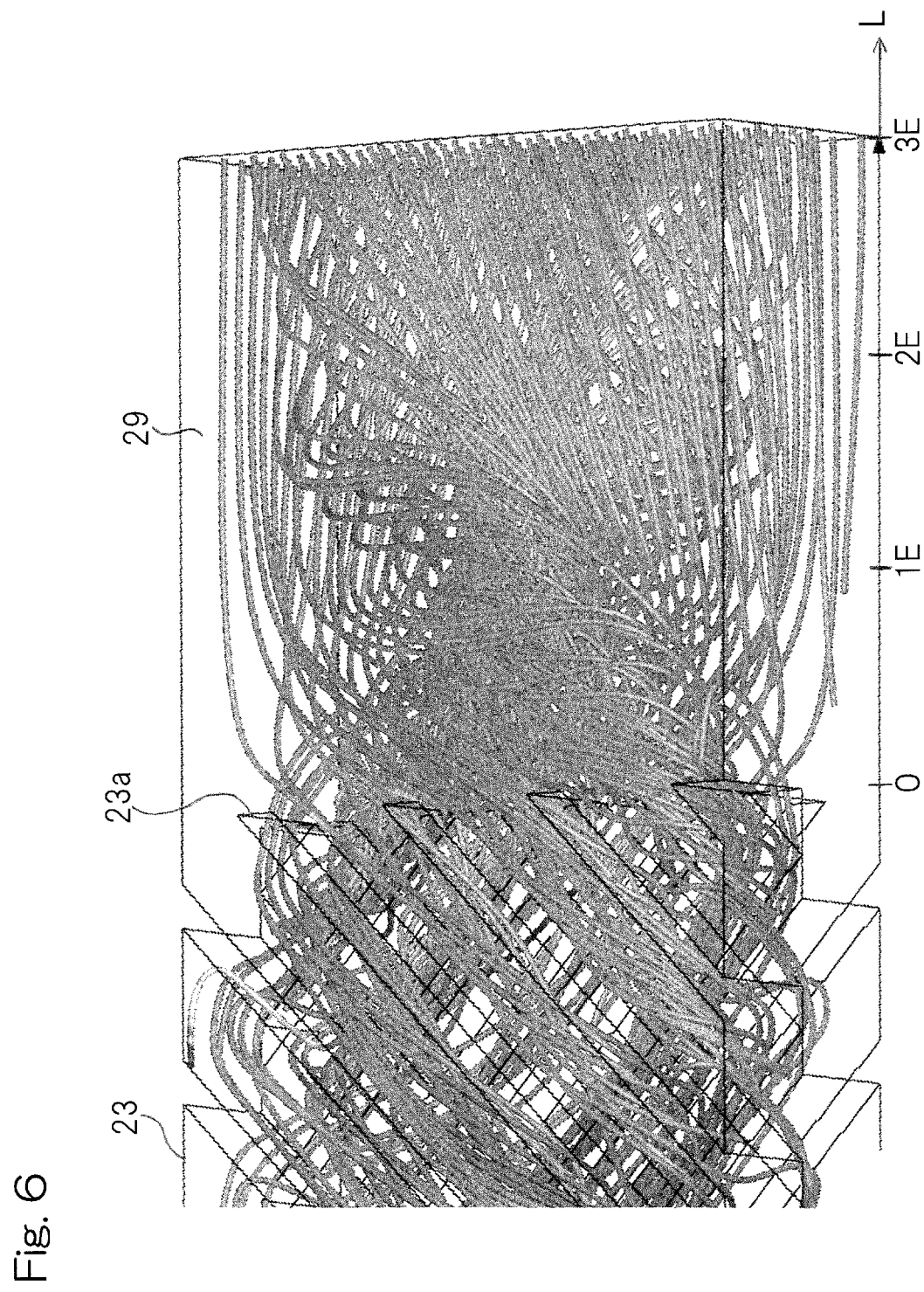
FIG. 6 is a diagram showing a result of simulation for a relation between the length of a flat surface portion and the intensity of vortex flow of a cooling medium in the cooling structure according to the embodiment of the present invention.

A result obtained by performing simulation for a relation between the length L of the flat surface portion 29 and the intensity of vortex flow of the cooling medium CL from such a standpoint is shown in FIG. 6. It was found that, with regard to the cooling medium CL that is an intense vortex flow immediately after being discharged through the outlet 23a of the lattice structure body 23, the intensity of the vortex flow starts significantly attenuating at the position where the length L of the flat surface portion 29=1E and the flow is gradually made uniform from this position toward the downstream side. Therefore, it is considered that, when the length L of the flat surface portion 29 is set so as to be 1E or greater, the direction of flow of the cooling medium CL flowing out through the outlet 23a of the lattice structure body 23 toward the rear side can be made uniform, thereby effectively performing film cooling of the exposed wall portion 27.

Figure 7:
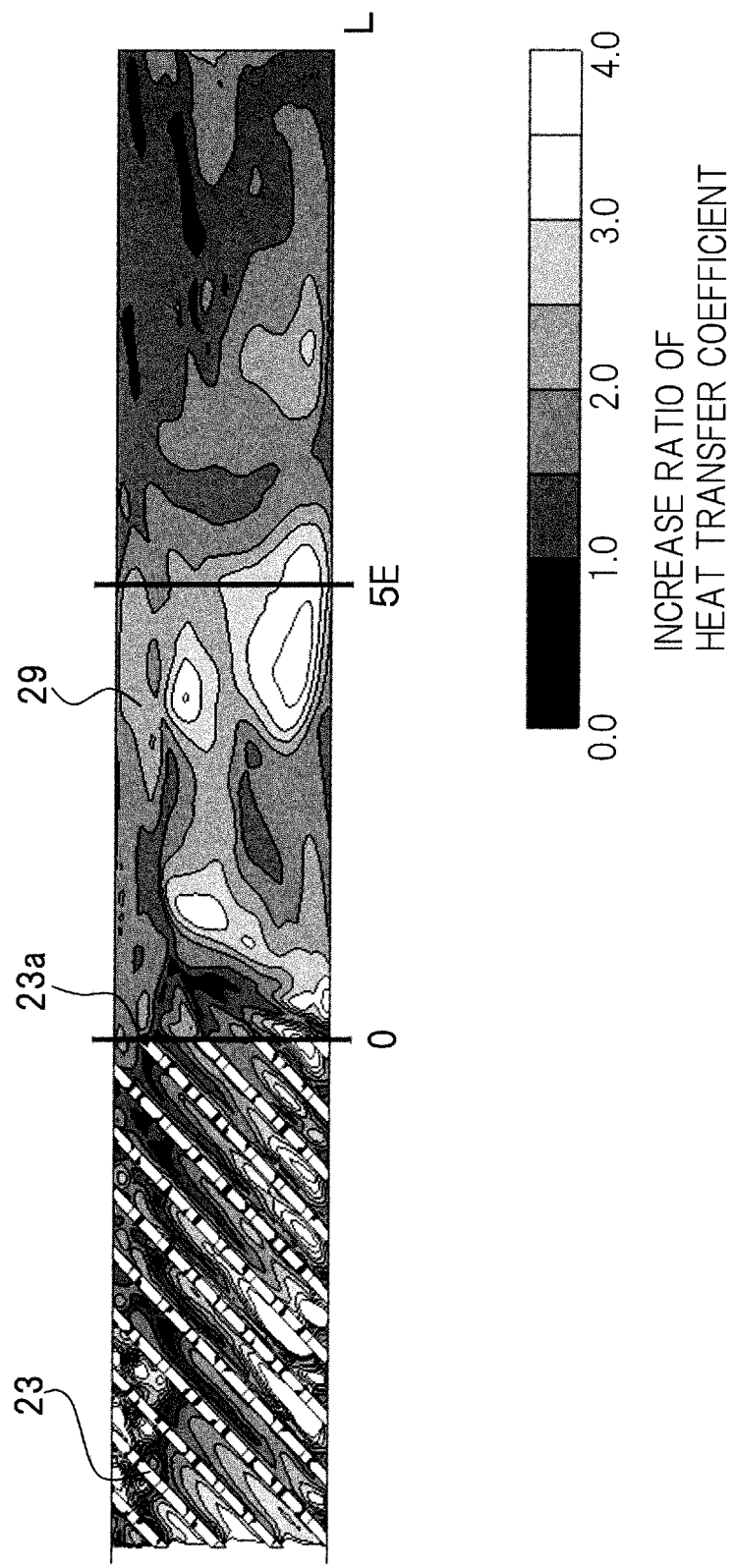
FIG. 7 is a diagram showing a result of simulation for a relation between the length of the flat surface portion and the heat transfer coefficient of a wall surface in the cooling structure according to the embodiment of the present invention.

Next, a result obtained by also performing simulation for a relation between the length L of the flat surface portion 29 and the heat transfer coefficient of a wall surface is shown in FIG. 7. A heat transfer coefficient obtained when a cooling medium flows, as uniform flow not containing any vortex flow, through a pipe having a smooth wall surface, is used as a reference (1.0), and FIG. 7 represents a ratio to this heat transfer coefficient. In a region upstream of the position where the length L of the flat surface portion 29=5E, even though the lattice structure body 23 is not present, there is a wide portion in which, due to the effect of vortex flow remaining in the cooling medium, the heat transfer coefficient on the wall surface is maintained at a higher value than in the case of flow of the cooling medium flowing on a normal smooth wall surface (almost completely uniform flow). Meanwhile, it was found that in a region downstream of the position where the length L of the flat surface portion 29=5E, the vortex flow in the cooling medium is almost completely eliminated, and the proportion of a portion in which the heat transfer coefficient on the wall surface has a value equal to that in the case of flow of the cooling medium flowing on a normal smooth wall surface increases rapidly. That is, in the region upstream of the position where the length L of the flat surface portion 29=5E, the cooling effect by the lattice structure body 23 remains. Therefore, it is considered that by making the length of the flat surface portion 29 equal to or less than 5E, film cooling of the exposed wall portion 27 can be performed while the cooling effect by the lattice structure body 23 is sufficiently obtained at the flat surface portion 29. From these results, the length L of the flat surface portion 29 is preferably within a range of not less than 1 time and not greater than 5 times of the outlet height E, and more preferably within a range of not less than 1.5 times and not greater than 3.5 times of the outlet height E.

In the present embodiment, since the movement direction M of the entire cooling medium CL is set to be a chord direction as shown in FIG. 2, the flat surface portion 29 in which the lattice structure body 23 is not present is formed in a region in the turbine airfoil rear end portion where the cooling passage width (the distance between the wall surfaces of the cooling passage) is short. Therefore, even when the lattice structure body 23 is omitted in this region, and this region is formed as the flat surface portion 29, a sufficient cooling effect is obtained by vortex flow discharged from the lattice structure body 23. In addition, it is not necessary to provide a lattice structure body 23 having a complicated configuration in the region where the cooling passage width is short, and thus it becomes easy to produce the turbine airfoil. Furthermore, the exposed wall portion 27 can be ensured to be wide in the height H direction of the turbine airfoil, and thus it is possible to further enhance the cooling efficiency for the entirety of the turbine airfoil. However, the movement direction of the cooling medium CL is not limited to the chord direction, and the arrangement of the lattice structure body 23, the flat surface portion 29, the cooling medium discharge port 25, and the exposed wall portion 27 may be set as appropriate in accordance with the movement direction of the cooling medium CL.

Figure 8:
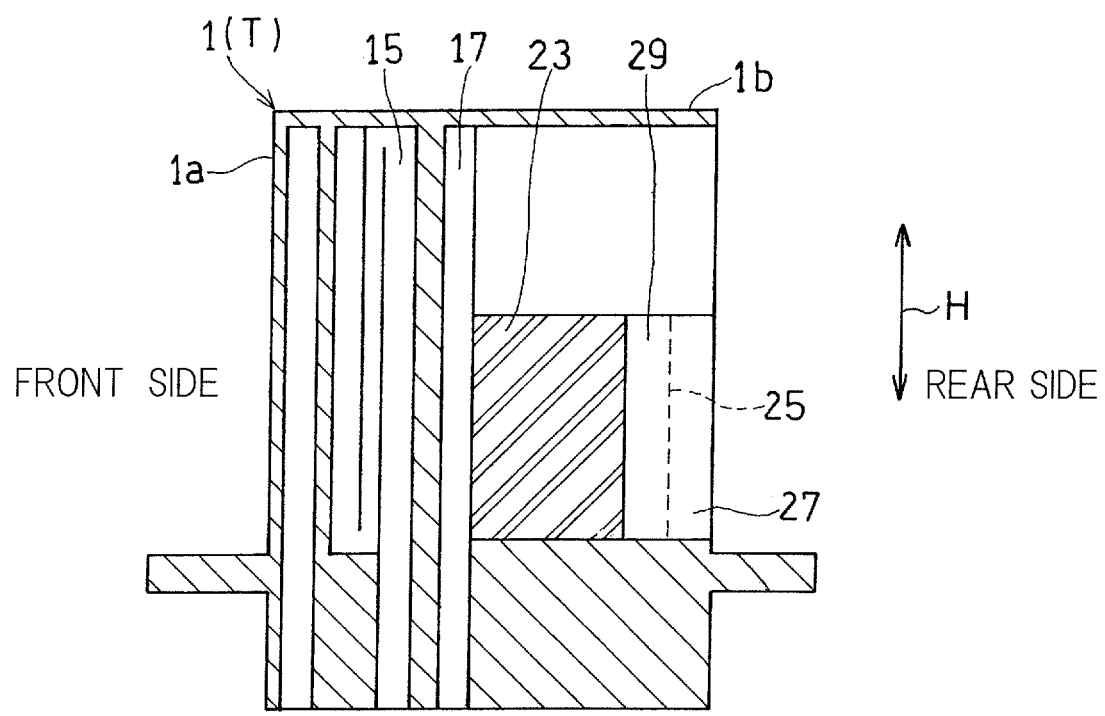
FIG. 8 is a longitudinal cross-sectional view schematically showing an example of arrangement of the cooling structure according to the embodiment of the present invention.

In the example in FIG. 2, the plurality of lattice structure bodies 23 separated in the height direction by the plurality of partition bodies 39 are provided in the rear cooling passage 17, but lattice structure bodies 23 that are not separated by any partition body 39 may be provided in the rear cooling passage 17. In addition, in the shown example, the lattice structure bodies 23 are provided over substantially the entirety in the height direction H (the radial direction of the turbine) of the turbine rotor blade 1, but a lattice structure body 23 may be provided only in a part in the height direction H of the turbine rotor blade 1. For example, as shown in FIG. 8, a lattice structure body 23 may be provided only at the base side of the turbine rotor blade 1 (in a half region at the base side in the shown example), that is, on the radially inner side. Accordingly, a base portion of the turbine rotor blade 1 that is a portion to which great stress is applied can be effectively cooled. For the same reason, in the case where a lattice structure body 23 is provided to a turbine stator vane, the lattice structure body 23 may be provided only at the base side of the turbine stator vane that is the radially outer side of the turbine.

As described above, in the cooling structure according to the present embodiment, in the process in which the cooling medium CL discharged as vortex flow from the lattice structure body 23 flows in the flat surface portion 29, the cooling medium CL is straightened to flow in a uniform direction along the wall surface, and then discharged through the cooling medium discharge port 25 to the exposed wall portion 27. Accordingly, the high-temperature gas G and the cooling medium CL are inhibited from being mixed together at the exposed wall portion 27, and a sufficient film cooling effect is obtained. Therefore, both cooling of the interior of the turbine airfoil by the lattice structure body 23 and film cooling of the turbine airfoil rear edge portion can be achieved with high efficiency, and thus it is possible to enhance the cooling efficiency for the entirety of the turbine airfoil.

Although the present invention has been described above in connection with the embodiments thereof with reference to the accompanying drawings, numerous additions, changes, or deletions can be made without departing from the gist of the present invention. Accordingly, such additions, changes, or deletions are to be construed as included in the scope of the present invention.

REFERENCE NUMERALS

1 . . . Turbine rotor blade (Turbine airfoil)
3 . . . First airfoil wall
5 . . . Second airfoil wall
17 . . . Rear cooling passage (Cooling passage)
23 . . . Lattice structure body
23a . . . Outlet of lattice structure body
25 . . . Cooling medium discharge port
27 . . . Exposed wall portion
29 . . . Flat surface portion
CL . . . Cooling medium
E . . . Outlet height of lattice structure body
G . . . High-temperature gas
GP . . . Passage for high-temperature gas
L . . . Length of flat surface portion

What is claimed is:

1. A structure for cooling a turbine airfoil of a turbine driven by a high-temperature gas, the structure comprising:
    a cooling passage formed between a first airfoil wall of the turbine airfoil that is curved so as to be concave relative to a passage for the high-temperature gas and a second airfoil wall of the turbine airfoil that is curved so as to be convex relative to the passage for the high-temperature gas;
    a lattice structure body including a first rib set composed of a plurality of first ribs provided on a wall surface, of the first airfoil wall, that faces the cooling passage, and a second rib set composed of a plurality of second ribs provided on a wall surface, of the second airfoil wall, that faces the cooling passage, the second rib set being stacked on the first rib set so as to form a lattice pattern;
    a cooling medium discharge port provided at a downstream end portion of the cooling passage and configured to discharge the cooling medium within the cooling passage to the outside;
    an exposed wall portion in the form of a portion of the second airfoil wall extending beyond the cooling medium discharge port to the outside; and
    a flat surface portion that is a portion of the cooling passage from an outlet of the lattice structure body to the cooling medium discharge port and at which the wall surface of the first airfoil wall and the wall surface of the second airfoil wall are formed as flat surfaces,
    wherein the flat surface portion has a length within a range of not less than 1 time and not greater than 5 times of a height of the outlet of the lattice structure body.

2. The structure for cooling the turbine airfoil as claimed in claim 1, wherein a movement direction of the cooling medium is a direction along a chord of the turbine airfoil, and a plurality of the lattice structure bodies are disposed so as to be juxtaposed to each other in a height direction of the turbine airfoil with a partition body interposed therebetween.

* * * * *